May 10, 1966   E. SMITH   3,250,437

SKID TANK AND VEHICLE COMBINATION

Filed Aug. 26, 1963

INVENTOR.
EARL SMITH
BY
Charles L. Lovenshuh
attorney

United States Patent Office 3,250,437
Patented May 10, 1966

3,250,437
SKID TANK AND VEHICLE COMBINATION
Earl Smith, 470 Park Ave., Meadville, Pa.
Filed Aug. 26, 1963, Ser. No. 304,563
2 Claims. (Cl. 222—176)

This invention relates to vehicles and, more particularly, to vehicles in combination with skid tanks for gasoline, motor oil, and the like.

The invention disclosed herein makes it possible for farmers and users of small quantities of gasoline to transport their own supply of gasoline in bulk quantities conveniently by means of a trailer or pick-up truck with a skid tank mounted on it. There is no present combination of a skid tank on a truck or trailer with an effective loading means. The present invention provides a simple, efficient, and economical means for loading, unloading, and transporting a tank full of gasoline or the like and for dispensing it from the tank.

It is, accordingly, an object of the present invention to provide an improved combination vehicle and tank.

Another object of the invention is to provide an improved combination vehicle, tank, and dispensing means therefor.

Still another object of the invention is to provide a combination vehicle and tank which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
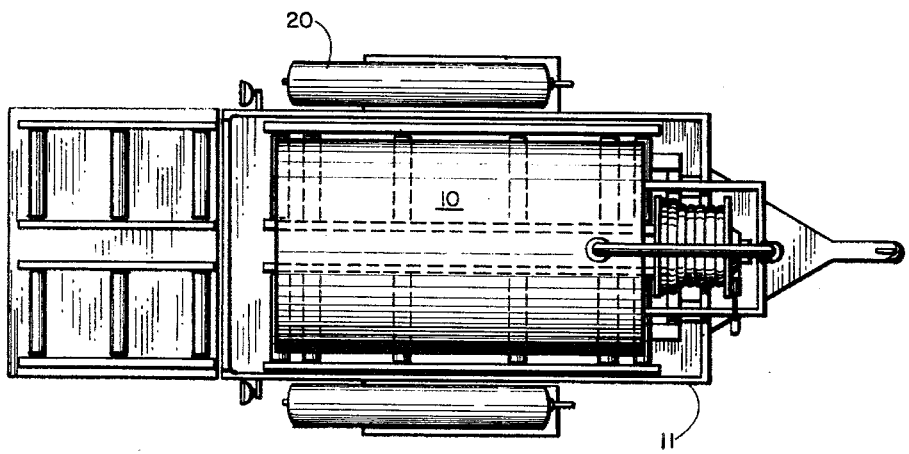
FIG. 1 is a top view of a skid tank and trailer in accordance with the invention.
Figure 2:
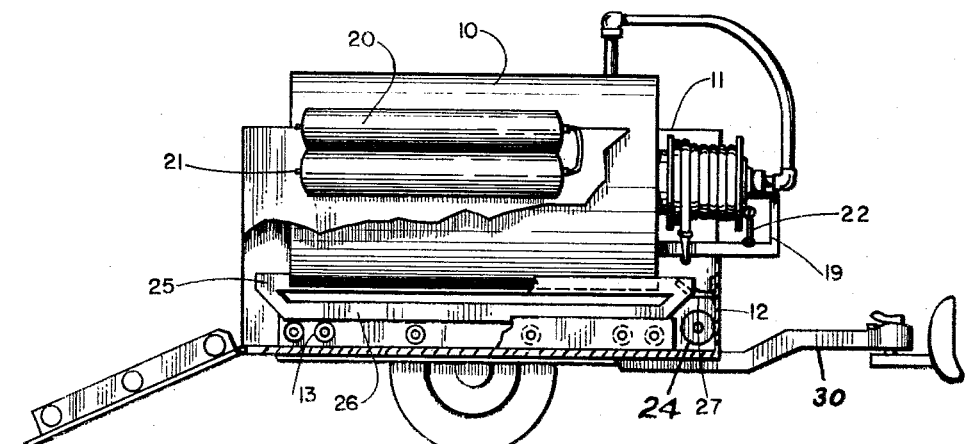
FIG. 2 is a side view of the trailer shown in FIG. 1 with parts thereof broken away.
Figure 3:
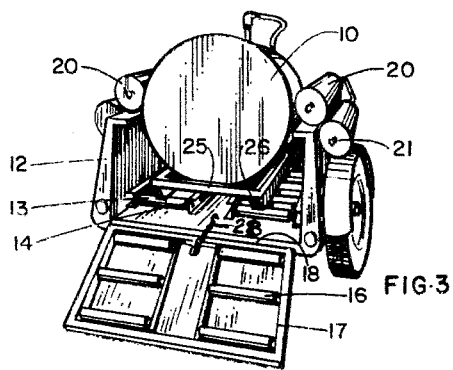
FIG. 3 is a rear view in perspective of the device shown in FIG. 2.

Now with more particular reference to the drawing, a cylindrical tank 10 is shown carried on a two-wheeled trailer 11. The trailer 11 has extra deep side walls on a box 12. The trailer box 12 has two pairs of conveyor rollers 13 supported on channels 14 which are welded to the bottom of the trailer. Similar rollers 16 are supported on roller frames 17 which are welded to the tail gate. The tail gate is hinged at its lower edge to the rear end of the floor of the box 12 at 18.

A hose reel is supported on a rotatable reel on a frame 19 which is welded to the front of the trailer 11. Gasoline may be forced from the tank 10 by compressed air tanks 20. The tanks 20 are fixed to each side of the trailer and may be charged through air valves 21 from any suitable source of compressed air. The compressed air can be used in the tank 10 to force gasoline or oil from the tank 10 to a higher level or to increase the rate of flow of the gasoline.

The rollers 13 are in two laterally spaced rows and rotatably supported by channels at their ends. These channels may be fixed to the bottom of the vehicle box 12. In like manner, the roller frame 17 supports the ends of the rollers 16 which are fixed to the top surface of the tail gate.

The trailer shown has a tongue 30 and a hitch of a conventional type. The hose may be reeled and unreeled by a suitable crank 22 attached to a pinion which drives a ring gear or the like to reel and unreel the hose.

FIG. 1 shows a top view of the inside of the box 12 showing a winch drum 24 which is used to pull the tank up into the trailer. The tank 11 is supported on a skid frame 25 which has runners 26 on it. The runners 26 have tapered front to rear ends and have the angle iron frame 25 supported thereon. The front ends of the runners 26 are forced under upwardly rearwardly inclined cleats 27 at the front of the trailer when the tank is pulled up into place.

In order to keep the tank from bouncing, the rear end of the frame 25 is hooked to a chain 28. The chain 28 is fixed to the tail gate at one end and the hook hooks over the frame 25.

The winch is provided with a hook that can hook onto the front ends of the runners 26 and pull them up over the rollers 13 and 16 into the trailer and under the cleat 27 so that the cleat 27 holds the front end of the device down while the rear end is held down by the chain 28. The trailer floor may be inclined rearwardly so that gravity will pull the tank out of the trailer when the winch is loosened.

The tanks 20 may be mounted on the side of the truck bed in close proximity to the side of the tank 10 and above the wheels of the trailer so that the overall width of the trailer is not increased by these tanks.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows.

What is claimed is:
1. A two-wheeled trailer and a tank,
said trailer having a hitch rigidly attached to its front end for attaching to a towing vehicle,
said vehicle having a floor with a rear tail gate swingably attached thereto and swingable from a vertical position to an inclined position with the lower end thereof in engagement with the ground,
rollers attached to said floor,
said tank having spaced runners attached thereto,
said runners being adapted to be carried by said rollers,
said vehicle having a front end wall,
a rearwardly extending lug fixed to said front end wall,
said lug extending upwardly and rearwardly and overlying and engaging means on said runners when said tank is in forward position on said rollers whereby said tank is held rigidly in position,
and a fastening means attached to said rear tail gate and adapted to be attached to said runners, holding said runners in firm engagement with said rollers,
a hose reel attached to said vehicle at the front end thereof,
said reel having an axis generally parallel to the direction of travel of said vehicle,
one end of said hose being connected to said tank.
2. In combination, a vehicle and a tank,
said vehicle having a floor with a rear tail gate swingably attached thereto and swingable from a vertical position to an inclined position with the lower end thereof in engagement with the ground,
rollers attached to said floor,
said tank having spaced runners attached thereto,
said runners being adapted to be carried by said rollers, a winch on said vehicle at the front part of said floor for pulling said tank and said runners over rollers on said tail gate when said tail gate is open and onto said floor rollers, said vehicle having a front end wall, a rearwardly extending lug fixed to said front end wall, said lug extending upwardly and rearwardly and overlying and engaging means on said runners when said tank is in a forward position on said rollers whereby said tank is held rigidly in position, a fastening means attached to said rear tail gate and adapted to be attached to said runners, holding said runners in firm engagement with said rollers, a hose reel attached to said vehicle at the front end thereof, said reel having an axis generally parallel to the direction of travel of said vehicle, one end of said hose being connected to said tank, and a relatively small cylindrical tank for compressed air attached to said vehicle at each opposite side thereof, said tanks having means thereon for connecting them to said first mentioned tank whereby material may be forced from said first mentioned tank.

References Cited by the Examiner

UNITED STATES PATENTS

| | | | |
|---|---|---|---|
| 719,372 | 1/1903 | Renger | 214—85.1 |
| 1,410,680 | 3/1922 | Isenberg et al. | 214—85 |
| 2,305,762 | 12/1942 | Cristofoletti et al. | 214—85.1 |
| 2,498,229 | 2/1950 | Alder | 222—399 X |
| 2,849,130 | 8/1958 | Van Der Velde | 214—85 |
| 2,958,432 | 11/1960 | Milhem | 214—84 |

HUGO O. SCHULZ, *Primary Examiner.*

GERALD M. FORLENZA, *Examiner.*